United States Patent [19]

Horton et al.

[11] 4,308,247
[45] Dec. 29, 1981

[54] RECOVERING NITROGEN BASES FROM A HYDROSULFIDE/SULFUR DIOXIDE REMOVAL PROCESS

[75] Inventors: Robert L. Horton; Melvin A. Albright, both of Bartlesville, Okla.

[73] Assignee: Phillips Petroleum Company, Bartlesville, Okla.

[21] Appl. No.: 160,261

[22] Filed: Jun. 17, 1980

[51] Int. Cl.³ .................. B01D 53/34; C01B 17/04
[52] U.S. Cl. .................. 423/574 R; 423/228; 423/234; 423/242; 423/356; 423/567 R; 423/573 G; 423/575; 423/37 FR
[58] Field of Search .......... 423/220, 223, 234, 224, 423/222, 228, 229, 243, 356, 461, 574, 578

[56] References Cited

U.S. PATENT DOCUMENTS

| | | | |
|---|---|---|---|
| 2,778,715 | 1/1957 | Austin | 423/461 |
| 2,796,327 | 6/1957 | Pollock | 423/375 |
| 2,881,047 | 4/1959 | Townsend | 423/222 |
| 2,987,379 | 6/1961 | Urban | 423/575 |
| 3,103,411 | 9/1963 | Fuchs | 423/224 |
| 3,170,766 | 2/1965 | Townsend | 423/222 X |
| 3,579,296 | 5/1971 | Cann | 423/242 |
| 3,777,010 | 12/1973 | Nicksic et al. | 423/573 |
| 3,873,673 | 3/1975 | Teague et al. | 423/243 |
| 3,959,451 | 5/1976 | Henderson et al. | 423/243 |
| 3,989,881 | 11/1976 | Hill | 423/573 G |
| 4,069,302 | 1/1978 | Meadow | 423/578 R |

OTHER PUBLICATIONS

Environmental Engineering, Deskbook Issue of Chemical Engineering, Apr. 27, 1980, pp. 173-189.

*Primary Examiner*—Earl C. Thomas

[57] ABSTRACT

A nitrogen base is separated from the sulfur-containing product of a gas phase reaction between a basic nitrogen compound and at least one of a hydrosulfide and sulfur dioxide by washing the product of the reaction, followed by basification and stripping of the wash liquid. In another embodiment, the nitrogen base is displaced from the sulfur-containing product with anhydrous ammonia.

22 Claims, 5 Drawing Figures

RECOVERING NITROGEN BASES FROM A HYDROSULFIDE/SULFUR DIOXIDE REMOVAL PROCESS

BACKGROUND OF THE INVENTION

The invention relates to the recovery of reagents and/or catalysts employed in the removal of hydrosulfides and sulfur dioxide from gas streams. Sulfur compounds are frequently present in gas streams encountered in the energy and chemical industries. It is frequently desirable to remove these compounds, which include sulfur dioxide and hydrogen sulfide as well as mercaptans, from gas mixtures. It would be extremely desirable to remove these compounds via an economic process which provides for the recovery of valuable end products and the reagents and/or catalysts employed to effect the removal.

OBJECTS OF THE INVENTION

It is an object of this invention to remove sulfur dioxide and hydrosulfides from a gas stream.

It is a further object of this invention to produce elemental sulfur from sulfur dioxide and hydrosulfides in a gas stream.

It is another object of this invention to produce water-insoluble sulfur salts from sulfur dioxide and hydrosulfides in a gas stream.

It is yet another object of this invention to recycle the reagents employed in the removal of sulfur dioxide and hydrosulfides from gas streams.

SUMMARY OF THE INVENTION

According to the invention, a gaseous basic nitrogen compound is contacted with at least one of sulfur dioxide and a gaseous hydrosulfide to produce a solid, sulfur-containing composition; the solid sulfur-containing composition is washed to separate elemental sulfur from a solution of basic nitrogen compound and water soluble sulfur salts; and the solution of basic nitrogen compound and water-soluble sulfur salts is treated and the basic nitrogen compound recovered and optionally recycled for further contact with the at least one of sulfur dioxide and a hydrosulfide. Optionally, according to the invention, the solution containing water soluble sulfur salts is treated to form water and insoluble sulfur salts.

According to another embodiment of the invention, basic nitrogen compound is recovered from the sulfur containing solid by displacing it with anhydrous ammonia.

DETAILED DESCRIPTION OF THE INVENTION

Figure 1:
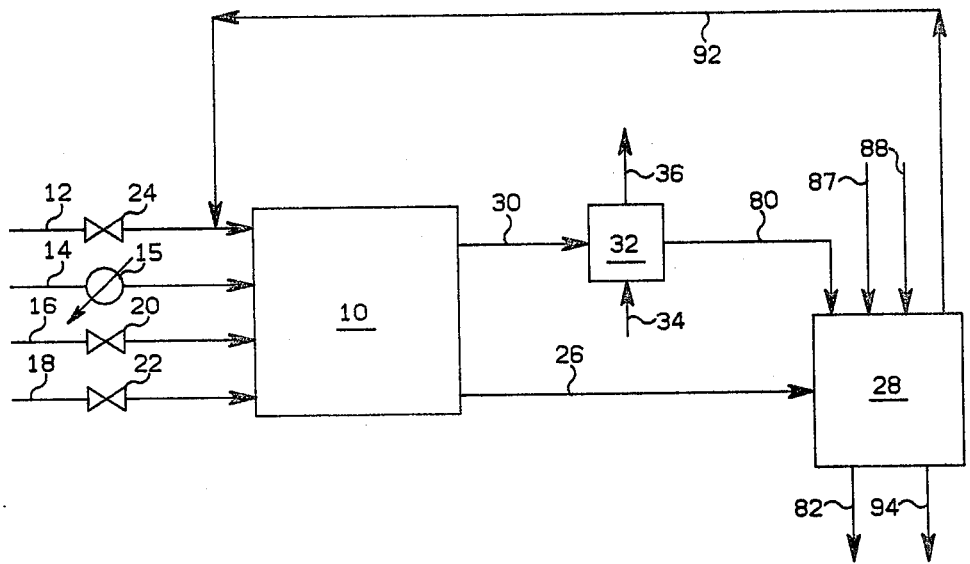
FIG. 1 is a block diagram illustrating the removal and recovery steps of the present invention.

Where appropriate, like numerals are used to designate like features in different Figures.

According to the invention, a basic nitrogen compound is introduced into a reactor 10 via a line 12 for contact with at least one of a hydrosulfide and sulfur dioxide introduced via line 14. Line 14 can be any gas stream which contains at least one of sulfur dioxide and a hydrosulfide, for example, stack gas or sour natural gas. Line 14 is optionally equipped with a heat exchanger 15 to heat or cool the gases as desired.

The basic nitrogen compound of line 12 is gaseous at the temperatures and pressures in reactor 10 and is selected from the group consisting of ammonia and amines. Preferably, the basic nitrogen compound has 20 or fewer carbon atoms, because such compounds are easily maintained as a vapor at the temperatures and pressures generally used in reactor 10. More preferably, the basic nitrogen compound is selected from the group consisting of ammonia, methylamine, dimethylamine, trimethylamine, ethylamine, diethylamine, triethylamine, isopropylamine, N-butylamine, sec-butylamine, tertbutylamine and pyridine, because such compounds have been tested with good results. Of these compounds, ethylamine, diethylamine and triethylamine are particularly preferred, because they drive the reaction at a particularly rapid rate. Also particularly preferred are dimethylamine, N-butylamine and sec-butylamine because they catalyze a reaction between sulfur dioxide and a hydrosulfide to produce a product which is itself active to catalyze the reaction.

The hydrosulfide is gaseous and selected from the group consisting of hydrogen sulfide and mercaptans. Preferably, the hydrosulfide has 20 or fewer carbon atoms so that it exists as a vapor at the temperatures and pressures generally used in reactor 10. More preferably, the hydrosulfide has 6 or fewer carbon atoms because such compounds are gaseous over a wide range of temperatures.

The pressure and temperature in reactor 10 is not critical, although higher pressures and temperatures tend to favor formation of the sulfur-containing solid from the sulfur-containing gases. However, at a temperature of over about 500° F. (260° C.), the basic nitrogen compound preferentially reacts with only $SO_2$ to form the solid sulfur-containing composition. When it is desired to remove both hydrosulfide and sulfur dioxide from a gas stream, the temperature is desirably maintained between about 25° C. and about 260° C., more desirably, between about 100° C. and 260° C., to inhibit water condensation and drive the reaction at a satisfactory rate. Because the solid-forming reaction proceeds in the absence of water and produces mainly water-insoluble products the temperature in reactor 10 is desirably maintained above the dew point. Reaction pressure is generally kept low for reasons of economics and can generally be selected from between 0 and 50 psig.

The gaseous basic nitrogen compound catalyzes the formation of a solid sulfur-containing composition from sulfur dioxide or a hydrosulfide and sulfur dioxide. When employing the basic nitrogen compound to catalyze the latter reaction, it is desirable to manipulate the mole ratio between sulfur dioxide and the hydrosulfide toward 1:1, which appears to be stoichiometric for the reaction at short reaction times, for example, between 0.05 and about five seconds. For this purpose, sulfur dioxide can be added to reactor 10 via a line 16 and hydrosulfide can be added via a line 18. This is advantageously accomplished by analyzing a portion of incoming gas stream 14 for sulfur dioxide and hydrosulfide and adjusting a valve 20 or 22 in lines 16 or 18, respectively, to achieve a mole ratio of sulfur dioxide to hydrosulfide in reactor 10 in the range of, for example, from about 0.7:1 to about 1.3:1. The basic nitrogen compound can be added to reactor 10 in catalytic, reagent, or excess quantities, depending on plant needs, by manipulation of valve 24 in line 12 in response to the monitored concentration of sulfur dioxide and hydrosulfide in the portion of gas stream 14. The amount of basic nitrogen compound is thus not critical. For the removal of sulfur dioxide and hydrogen sulfide at about a 1:1 mole ratio, the stoichiometric amount of basic nitrogen compound for a fast reaction appears to be about 1 mole, i.e., a stoichiometric mole ratio appears to be about 1:1:1 of sulfur dioxide: hydrogen sulfide: basic nitrogen compound. For the removal of sulfur dioxide and a mercaptan at a 1:1 mole ratio, the stoichiometric amount of basic nitrogen compound for a fast reaction appears to be about 2 moles, i.e., a stoichiometric mole ratio appears to be about 1:1:2 of sulfur dioxide:mercaptan:basic nitrogen compound. Broadly, the mole ratio of basic nitrogen compound to combined moles of sulfur dioxide and hydrosulfide is from about 0.001:1 to about 10:1, with a range of from about 0.001:1 to about 1:4 being considered as a catalytic quantity, a range of from about 1:4 to about 2:1 being considered as a reagent quantity, and a range of from about 2:1 to 20:1 and upwards being considered an excess quantity. In accordance with the present invention, excess quantities of the basic nitrogen compound can be economically employed for a rapid reaction which reduces the combined concentration of sulfur dioxide and hydrosulfide in the gas stream to less than 10 parts per million by weight (ppm) by recovering and recycling the excess.

In reactor 10, a solid-forming reaction occurs between the sulfur dioxide and optional hydrosulfide. The solid comprises mostly elemental sulfur particulate and other sulfur-containing solid compositions, for example, sulfites and thiosulfites. The basic nitrogen compound is absorbed or complexed in or on the solid material. Most preferably, the temperature in reactor 10 after the solid-forming reaction is between the boiling point of water and the melting point of sulfur, for example, between about 212° F. (100° C.) and about 230° F. (110° C.) although other temperatures can be utilized if desired.

The particulate is separated from the gases by any suitable means, for example, by cyclone separation, water scrubbing, filtering or electrostatic precipitation. As illustrated, a major portion of the particulate is removed from reactor 10 via a line 26 and transported to a recovery zone 28. The partially cleansed gases are removed from the reactor 10 via a line 30 and transported to an after-treating zone 32 for the removal of residual contaminants, for example, fine fly ash. As illustrated, after-treating zone comprises a water scrubber fed by a water line 34. After scrubbing, the cleansed gases are discharged from the scrubber via a line 36.

Figure 2:
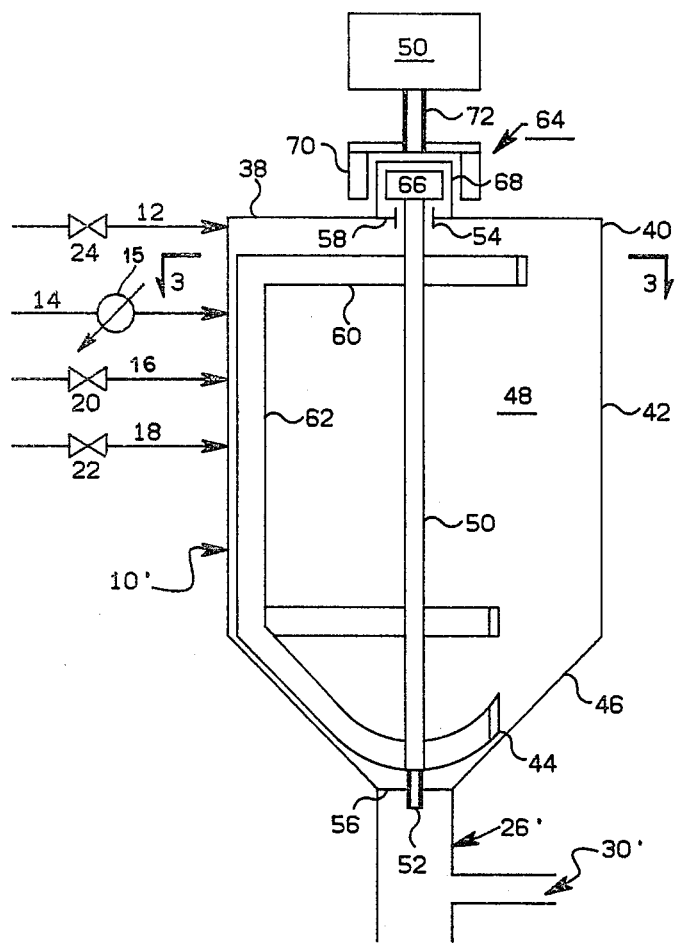
FIG. 2 illustrates in sectional view an apparatus suitably employed in the removal step of the present invention.
Figure 3:
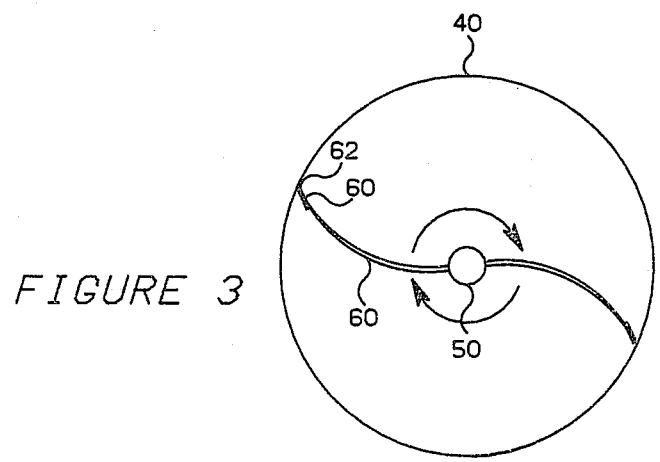
FIG. 3 is a sectional plan view of the apparatus of FIG. 2, taken along the indicated lines.

Referring now to FIGS. 2 and 3, there is illustrated an apparatus 10' suitably employed as reactor 10. A reactor shell 38 is provided having an upper portion 40 with a generally cylindrical interior surface 42 and a lower portion 44 with a generally frustoconical interior surface 46. Scraping means 48 driven by motor means 50 scrape accumulated particulate from surfaces 42 and 46. Particulate migrates toward the lower portion 44 and is discharged from reactor 10 via line 26'. Partially cleansed gases are recovered via line 30', which in this case is in communication with line 26'.

Scraping means 48 comprises a shaft 50 longitudinally disposed within the reactor 10, supported adjacent its lower end by a bushing 52 and adjacent its upper end by a bushing 54. Bushings 52 and 54 are in cooperation with the interior surface of reactor 10 via mounting means 56 and 58, respectively. Arm elements 60 establish cooperation between shaft 50 and blades 62, which scrape particulate from the interior surface of reactor 10. As illustrated, arm elements 60 comprise arcuate leaf springs which bias blades 62 against the interior surface of reactor 10 at an acute angle.

Coupling means 64 establish cooperation between scraping means 48 and motor means 50. Coupling means 64, as illustrated, is magnetic, to elminate opportunity for leakage. As illustrated, a disc 66 having magnets embedded in its cylindrical surface is affixed by one of its flat surfaces to the upper end of shaft 60. The disc 66 is situated interiorly of a protruding window 68 through the upper portion 40 of the reactor 10. The window 68 is constructed of a material transparent to magnetic forces, such as a ceramic material or aluminum. Exteriorly of window 68 is a drive magnet 70 having a generally cylindrical interior surface with magnets embedded therein facing the generally cylindrical exterior surface of magnetic disc 66. Magnet 70 is affixed to motor output shaft 72. During operation of reactor 10, scraping means 48 rotates within reactor shell 38. Should seize-up occur, motor means 50 can be reversed and re-reversed until smooth operation resumes.

Figure 4:
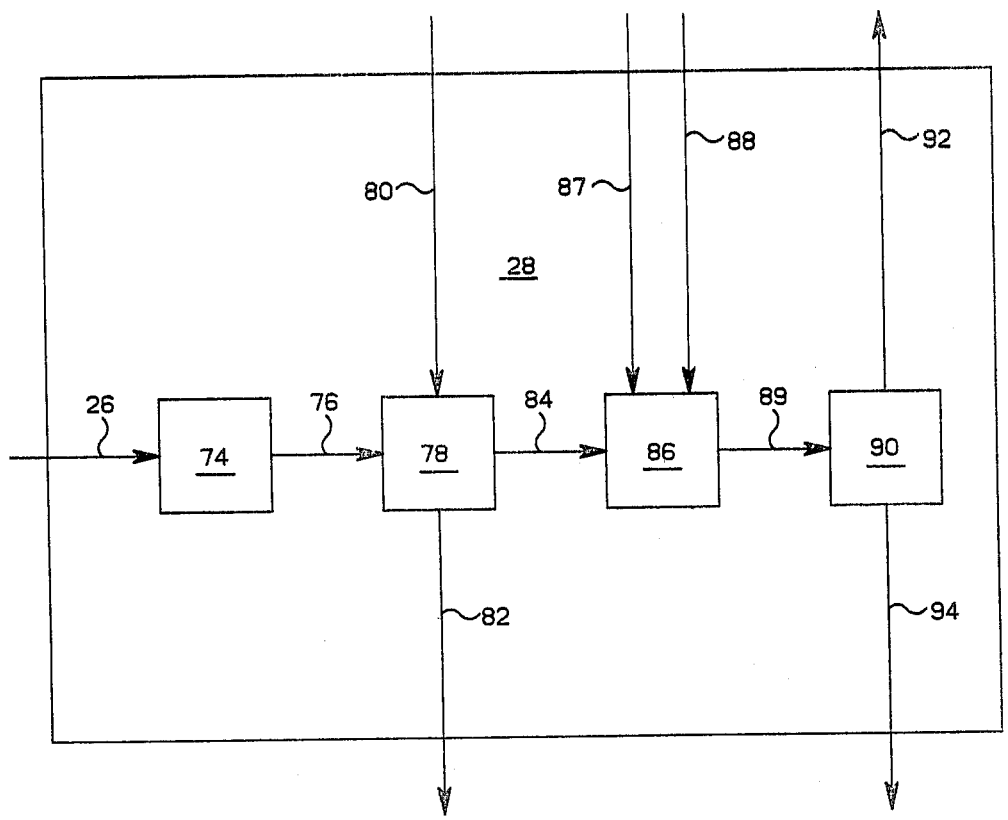
FIG. 4 is a block diagram illustrating the recovery step of the present invention.

Referring now to FIG. 4, particulate material from line 26 is subjected to a pulverizing step, if necessary, in pulverizing zone 74. The particulate is passed from zone 74 via a line 76 to a sulfur separation zone 78. Water is introduced into the zone 78 via a line 80 and mixed with the particulate therein. If desired, and as illustrated, water line 80 can be in communication with scrubbing zone 32 to recover the scrubbing liquid employed to aftertreat the partially cleansed gases withdrawn from reactor 10 via line 30. This aspect of the invention allows the scrubbing liquid to also be employed as the washing liquid or if desired, the scrubbing liquid can be combined with the washing liquid after the washing steps.

In sulfur separation zone 78, the wash liquid dissolves the water soluble components of the particulate. Preferably, the mixture in zone 78 is agitated to insure a good wash. Generally, the temperature in zone 78 will be from about 40° F. (about 50° C.) to about 220° F. (about 105° C.), usually from about 50° F. (about 10° C.) to about 90° F. (about 32° C.) for reasons of convenience. The amount of water employed in the wash should be enough to insure substantial removal of the water soluble portion, and is normally within the range from about 1 pound to about 50 pounds per pound of particulate to be washed. Elemental sulfur, being water insoluble, can be separated from the mixture by any suitable means and withdrawn from zone 78 via line 82 for further processing if desired, for example, drum drying.

The liquid phase in zone 78 contains mostly water, basic nitrogen compounds, and water soluble sulfur compounds. The liquid phase is withdrawn preferably following the phase separation of the elemental sulfur and passed via line 84 to basification zone 86. In the zone 86, the wash liquid is basified with any suitable water soluble base introduced via line 87, preferably to a pH of between about 8 and 13. Preferably, the pH of the wash liquid is raised with an alkali, as used herein referring to salts of Group IA and IIA metals, for example, calcium hydroxide, magnesium hydroxide or sodium carbonate. Alkaline earth oxides and hydroxides are preferred because the cationic portion reacts with sulfur-containing anion to form water insoluble sulfur salts, which can be recovered via phase separation, if desired, or disposed of, for example, in a settling pond. Optionally, the wash liquid in zone 86 can be oxygenated with an oxygen-containing gas, such as air introduced to zone 86 via line 88 to oxidize any sulfur-containing anions present so that the alkali treatment produces highly stable water insoluble sulfur salts. The oxidation step is preferably carried out near the boiling point of water at the pressure employed, for example, between about 160° F. (about 70° C.) and about 220° F. (about 105° C.) at ambient pressure.

The liquid and optional solids in zone 86 are passed via line 89 to column 90 for stripping. The volatile basic nitrogen compounds are easily removed from column 90 as an overhead product via line 92. The contents of line 92 are preferably routed back to line 12 as recycle. Stripper bottoms containing sulfur salts are removed via line 94 for disposal.

According to another embodiment of the invention, basic nitrogen compound is recovered from the sulfur-containing solid by displacing it with anhydrous ammonia. The amount of ammonia employed is not particularly important. Generally, the sulfur-containing composition should be contacted with a sufficient amount of ammonia to displace at least a portion of the basic nitrogen compound which is combined therewith. When a less than stoichiometric amount of ammonia is employed, i.e. less than the amount necessary to displace essentially all of the basic nitrogen compound (presumed to be about 1 mole of ammonia per mole of basic nitrogen compound to be displaced), recovery can be enhanced by subjecting the sulfur-containing composition to heat after it has been contacted. For example, when the sulfur-containing solid is in admixture with carbon black, it may be undesirable to contact the black with a sufficient amount of ammonia to displace all of the basic nitrogen compound from the sulfur-containing solid in the black. It may be preferable to contact the black with less than a stoichiometric amount of ammonia, so that the acidity of the black can be partially preserved. Preferably, the black is then heated to a temperature near the boiling point of the basic nitrogen compound, for example, for many amines at atmospheric pressure that would be about 212° F. (100° C.) to drive off gaseous basic nitrogen compound and ammonia. The ammonia can be separated from the basic nitrogen compound by any suitable means, for example, in a condensation column.

In another aspect of this embodiment, the sulfur-containing solid can be contacted with excess ammonia (i.e. more than the amount necessary to eventually displace essentially all of the basic nitrogen compound) for example, in a fluidized or moving bed. Preferably, this embodiment of the invention is carried out at a sufficiently high temperature and/or a sufficiently low pressure so that the basic nitrogen compound is displaced from the sulfur-containing solid into the vapor phase. The best temperature/pressure combination will, of course, depend on the specific basic nitrogen compound to be recovered. The basic nitrogen compound can be separated from the excess of the ammonia by any suitable means, for example, in a condensation column. The ammonia and basic nitrogen compound can be recycled if desired.

Figure 5:
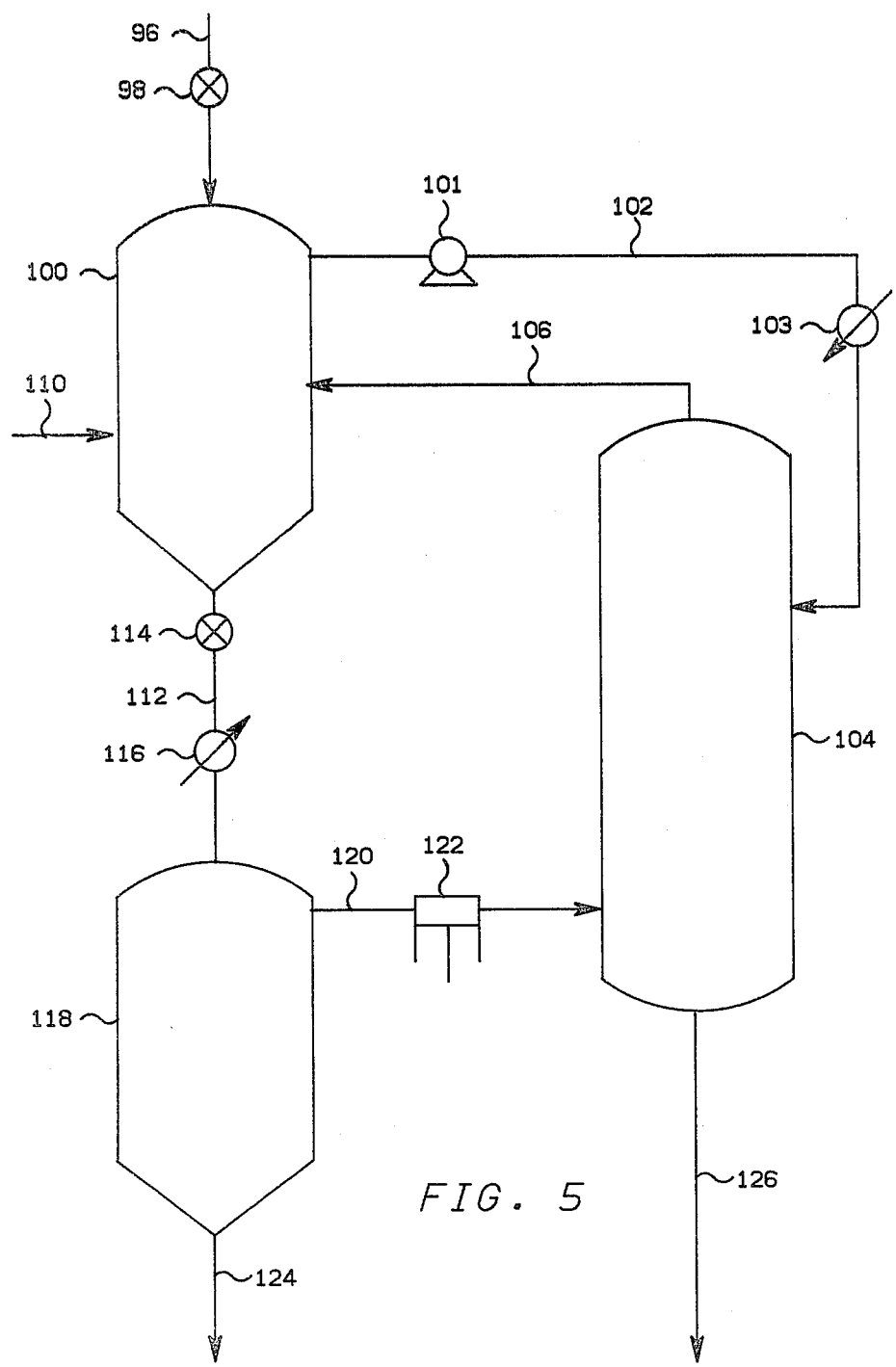
FIG. 5 diagrammatically illustrates recovery steps according to another embodiment of the invention.

With reference to FIG. 5, sulfur-containing solids carried in a line 96 are introduced via a solids feeder 98 into a vessel 100. The solids are countercurrently contacted with anhydrous ammonia introduced into the vessel 100 by a line 106. The ammonia from line 106 displaces amine from the solid material. The temperature and pressure in vessel 100 are selected sufficiently high so that the ammonia and the displaced amine are in the vapor phase but not so high that the sulfur-containing solid melts. Ammonia vapor containing displaced basic nitrogen compound is withdrawn from vessel 100 via overhead line 102, and pumped to a fractionator 104 by pump 101. Preferably, the vapor is cooled to form a mixed phase by a condensor 103 before entering fractionator 104. In fractionator 104, the ammonia is separated from the amine and withdrawn from the column via overhead line 106, for recycle to vessel 100. Make-up ammonia can be added to vessel 100 via line 110 as needed.

After treatment in vessel 100, the sulfur-containing solid material, at this point containing ammonia, is withdrawn by solids feeder 114 to line 112. A heater 116 in cooperation with line 112 heats the solid material to increase the vapor pressure of the ammonia. The solid material is then emptied into a flash zone 118 operated under conditions to flash ammonia vapor and residual amine from the solid material. The flashed vapor is withdrawn from zone 118 via line 120, compressed by compressor 122, and emptied into fractionator 104, for separation of the amine and the ammonia. The sulfur-containing solid material is withdrawn from flash zone 118 via a line 124. The amine is withdrawn from fractionator 104 as bottoms stream 126, for recycle to the solids forming material is desired.

In yet another aspect of this embodiment of the invention, the sulfur-containing solid can be washed with anhydrous ammonia at a sufficiently low temperature and/or high pressure to maintain the wash in the liquid phase. In this embodiment, it is preferable to reuse the wash ammonia until the concentration is displaced basic nitrogen compound contained therein becomes so high that it interferes in the displacement of additional basic nitrogen compound from fresh sulfur-containing solid. It is then desirable to purify the ammonia for further use and recover the basic nitrogen compound for recycle for contact with sulfurous gas stream. The purification can be carried out via a separation by any suitable means, for example, fractionation in a stripping column. This embodiment of the invention is particularly useful in situations where it is not desirable to wet the sulfur-containing solid with water.

CALCULATED EMBODIMENTS

The following two calculated embodiments illustrate representative embodiments of the invention.

Calculated Embodiment 1

Sour gas from the stripper of a natural gas amine treater in the service of removing acid gases from natural gas is fed to a vapor phase sulfur removal unit at a rate of 40,000 SCFH (standard cubic feed per hour). The gas composition (in mole percent) is:
$CO_2$, 62%;
$H_2S$, 37%;

CH$_4$, 1%;
providing a rate of treatment of H$_2$S of 39.0 lb moles per hour. The sour gas is heated to about 270° F., blended with 19.5 lb moles per hour of SO$_2$ and 2.0 lb moles per hour of diethylamine and introduced into reaction zone 140 operating at 270° F. and 0.5 psig and with a residence time of 2.5 minutes. Reactor effluent is cooled to about 100° F. and pased through vapor-solids separation zone 200 from which purified off-gas is removed at a rate of 25,200 SCFH. This gas is approximately 98.4% CO$_2$ and 1.6% CH$_4$ and contains less than 20 ppm each of H$_2$S and SO$_2$. Sulfur solids composed of about 96.9 weight percent free sulfur and 3.1% compounds of sulfur in broad form are removed at a rate of 1,000 lb/hr and are passed to water wash zone where they are contacted with wash water at a rate of about 8 pounds of water per pound of solids, at about 100° F. and with a residence time of about one minute. Sulfur solids are filtered from the water and are suitably dried; the filtrate is contacted with slaked lime at a rate of 74 lb/hr using an in-line mixer, raising the pH of the water to about 10. The alkaline water is suitably stripped, for example in a 10-tray fractionating column to remove diethylamine as overhead product and water containing insoluble calcium salts as bottoms product.

Calculated Embodiment 2

Off-gas from a carbon black plant is yielded to a sulfur removal plant at a rate of 2,000,000 SCFH. Approximate gas composition on a volume basis, water-free, is:

|  | Mole % |
| --- | --- |
| CO | 14 |
| CO$_2$ | 5 |
| H$_2$ | 14 |
| Hydrocarbons | 1 |
| N$_2$ | 66 |
| SO$_2$ | 1,000 ppm |
| H$_2$S | 2,400 ppm |

The gas is available at 500° F. and 2 psig and is reacted at these conditions after being blended with additional SO$_2$ at a rate of 2,800 SCFH and diethylamine at a rate of 980 lb/hr. At this temperature, a reaction time of only approximately 2 seconds is required to reduce the SO$_2$ and H$_2$S content of the treated gas to less than 20 ppm each. The reactor effluent is quenched and cooled to about 120° F. and water washed. Downstream treatment is similar to that for Calculated Embodiment 1.

Although the invention has been described in detail for purposes of explanation and illustration, it is not intended to be limited thereby. Rather, reasonable modifications and additions which would be apparent to one with ordinary skill in the art are included within the scope of this invention.

That which is claimed is:

1. A process comprising:
    (a) contacting a gaseous basic nitrogen compound with a first gas stream comprising gaseous hydrosulfide and sulfur dioxide to form a second gas stream and a solid sulfur-containing composition containing elemental sulfur;
    (b) contacting at least a portion of the solid, sulfur-containing composition with an aqueous wash liquid to produce an aqueous solution containing a water-soluble portion of the sulfur-containing composition;
    (c) separating at least a portion of the aqueous solution from a water insoluble portion of said sulfur-containing composition which contains elemental sulfur;
    (d) basifying at least a portion of the aqueous solution to form a mixture comprising the basic nitrogen compound and a basic wash liquid; and
    (e) separating at least a portion of the basic nitrogen compound from at least a portion of the basic wash liquid.

2. A process as in claim 1 wherein an alkali is employed to basify the wash liquid.

3. A process as in claim 2 wherein the alkali is selected from the group consisting of sodium carbonate calcium hydroxide and magnesium hydroxide.

4. A process as in claim 3 further comprising contacting at least a portion of the aqueous solution with free oxygen-containing gas.

5. A process as in claim 4 further comprising recovering the water insoluble portion of the sulfur-containing solid from the aqueous solution.

6. A process as in claim 5 further comprising scrubbing the second gas stream with an aqueous scrubbing liquid and employing at least a portion of the scrubbing liquid as at least a portion of the wash liquid.

7. A process as in claim 6 wherein said basic nitrogen compound is separated from the basic wash liquid in a stripping column.

8. A process as in claim 7 further comprising recycling at least a portion of the separated basic nitrogen compound for contact with said sulfur dioxide and said hydrosulfide.

9. A process as in claim 1 wherein said basic nitrogen compound is selected from the group consisting of ammonia and an amine.

10. A process as in claim 9 wherein said basic nitrogen compound is an amine.

11. A process as in claim 1 wherein said basic nitrogen compound is selected from the group consisting of ethylamine, diethylamine and triethylamine.

12. A process as in claim 8 wherein said basic nitrogen compound is selected from the group consisting of dimethylamine, N-butylamine, and sec-butylamine.

13. A process as in claim 11 wherein the basic nitrogen compound is contacted with both sulfur dioxide and a hydrosulfide.

14. A process as in claim 13 wherein said hydrosulfide is hydrogen sulfide.

15. A process as in claim 14 wherein the mole ratio between the sulfur dioxide and the hydrogen sulfide with which the basic nitrogen compound is contacted is between about 0.7:1 and 1.3:1.

16. A process as in claim 15 wherein said basic nitrogen compound is contacted with the sulfur dioxide and hydrogen sulfide at a temperature of between about 100° C. and 260° C. at a pressure below the dew point of water.

17. A method comprising:
    (a) contacting a gaseous amine with a first gas stream comprising at least one of a gaseous hydrosulfide and sulfur dioxide to form a second gas stream and a solid sulfur-containing composition;
    (b) contacting at least a portion of the solid, sulfur-containing composition with anhydrous ammonia to displace at least a portion of the amine from the solid, sulfur-containing composition;

(c) separating at least a portion of the amine from the anhydrous ammonia and sulfur-containing composition.

18. A method as in claim 17 wherein the ammonia with which the sulfur-containing composition is contacted is in the gas phase.

19. A method as in claim 18 wherein the amine is separated from the ammonia by condensation.

20. A method as in claim 19 further comprising heating the sulfur-containing composition after contacting it with the ammonia.

21. A method as in claim 17 wherein the ammonia with which the sulfur-containing composition is contacted is in the liquid phase.

22. A method as in claim 21 wherein the amine is separated from the ammonia by fractionation.

* * * * *